INVENTOR
GENUNG L. CLAPPER

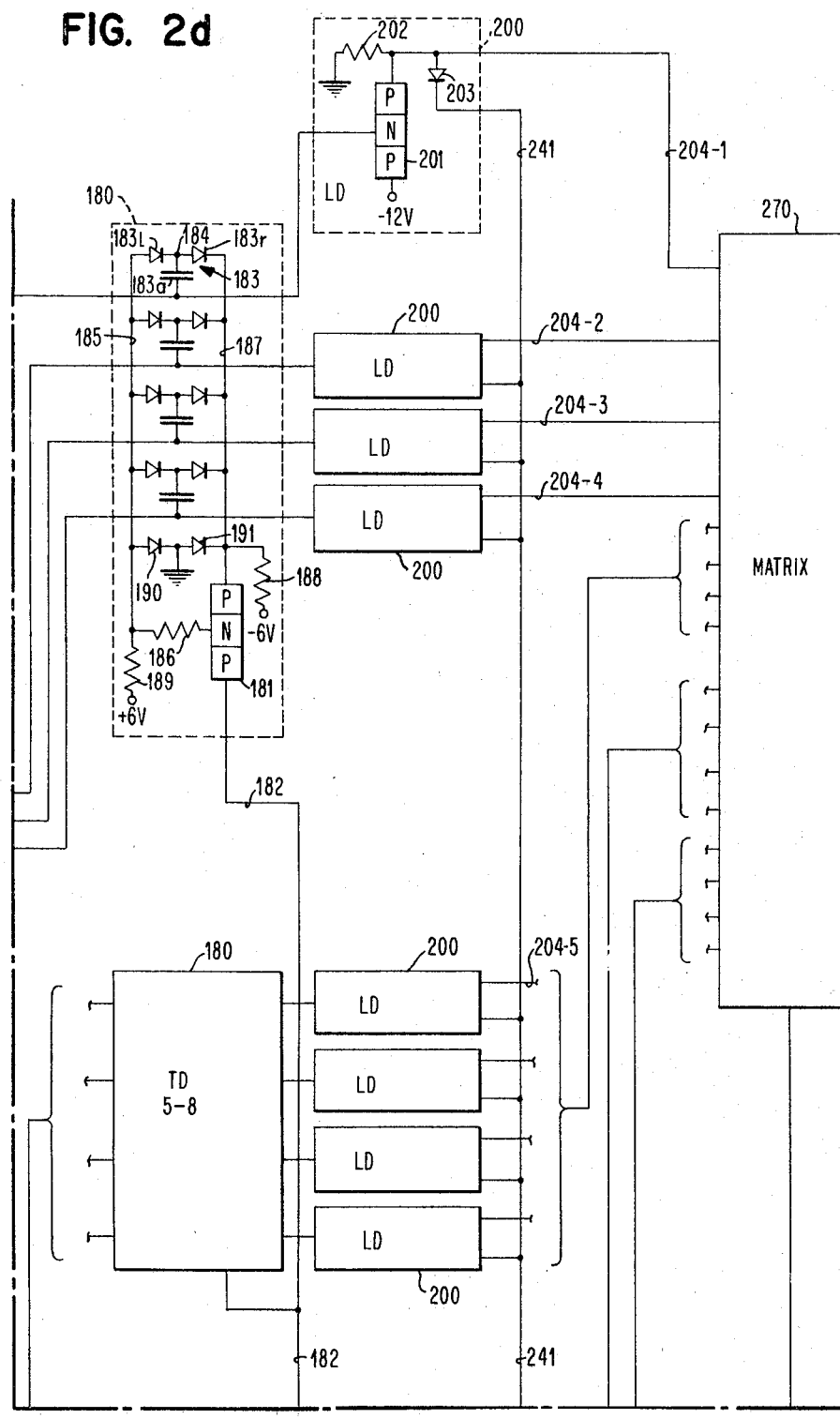

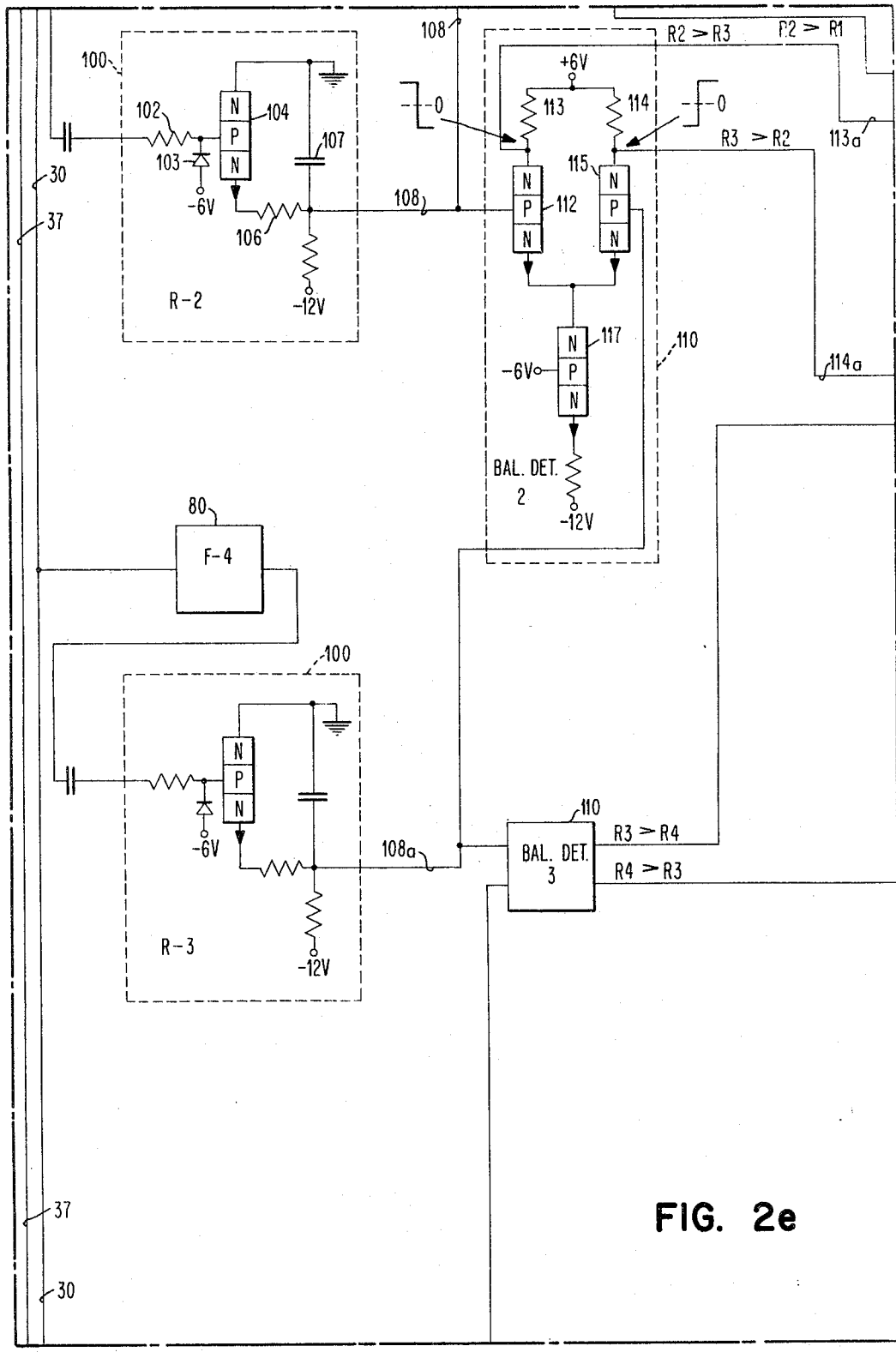

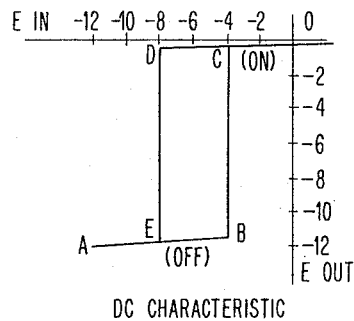
FIG. 4
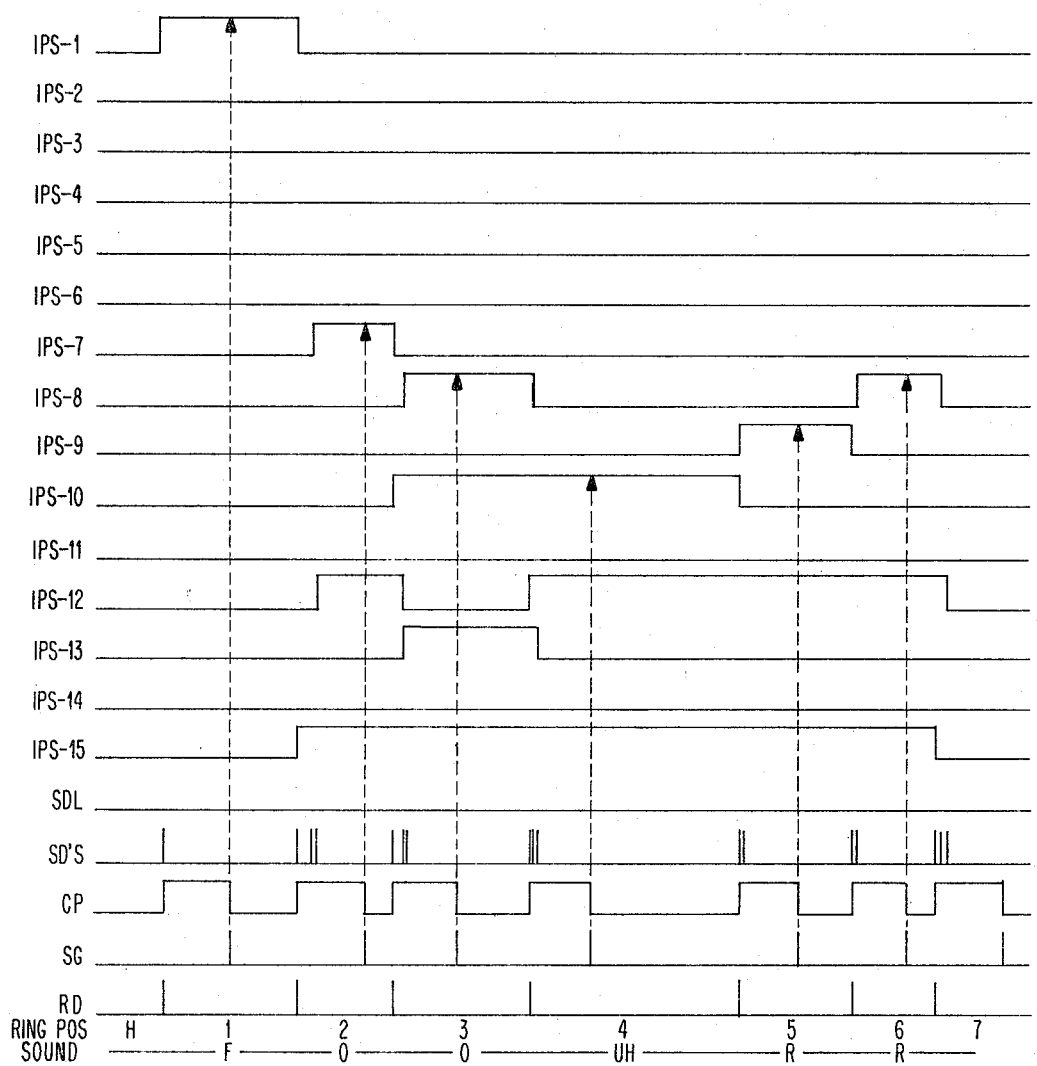
FIG. 5   WAVE FORMS FOR "FOUR"

3,296,374
SPEECH ANALYZING SYSTEM
Genung L. Clapper, Vestal, N.Y., assignor to International Business Machines Corporation, New York, N.Y., a corporation of New York
Filed June 28, 1963, Ser. No. 291,344
6 Claims. (Cl. 179—1)

This invention relates generally to speech or sound waveform analyzing systems and, in particular, to a speech formant location system. By definition, formant, as used herein, means a series of interrelated energy peaks or local maxima. In the speech frequency band of the sound spectrum, for any given instant of time, there are usually from one to four such energy concentrations or formants formed by the oral and nasal passages of the human sound generating system. As words are formed, these concentrations of energy shift about, merge or fade out completely and, because of this, "tracking" of formants by prior art methods and systems have had limited success.

Other speech analyzing systems of the prior art have utilized the principle of the energy threshold method wherein fixed bands of frequencies of the sound spectrum were selected to yield values above a certain threshold value. This method, however, provided inferior results in that the threshold value would change with variations in intensity.

Yet other prior art systems have utilized "tracking" for locating formants. However, in attempting to track, or follow, the variation of frequencies of the energy spectrum, difficulties have arisen because of the inability to properly locate the beginning of the formant, and the further difficulty of following formants during subsequent variations thereof.

The main object is to analyze speech by the use of a novel formant analyzing system.

Another object resides in providing means for detecting, at any given instant of time, the local maxima in the energy content of the speech spectrum.

The foregoing and other objects, features and advantages of the invention will be apparent from the following more particular description of a preferred embodiment of the invention, as illustrated in the accompanying drawings.

In the drawings:

FIG. 4 shows the hysteresis characteristics of an integrating pulse shaper.

FIG. 5 is a diagram of the principal waveforms generated by the present invention during an analysis of the spoken word "four."

Figure 1:
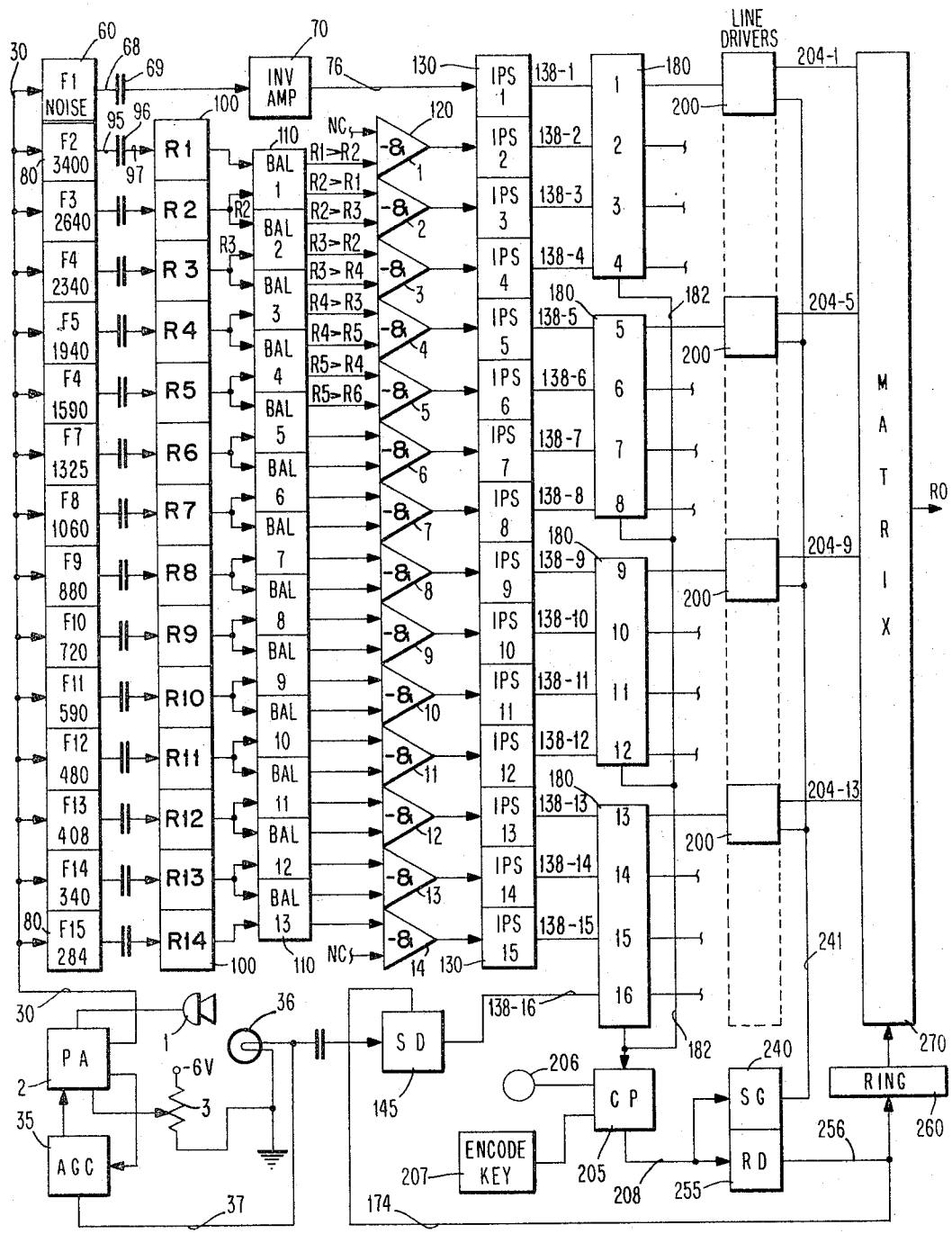
FIG. 1 is a schematic drawing of a formant analyzing system incorporating the invention.

A general description of the invention will now be given. Referring to FIG. 1, a microphone 1 converts sound waves to electrical signals that are amplified by a pre-amplifier 2. An input sensitivity control 3 is adjustable to reject background noise. The gain is dynamically adjusted to hold the pre-amplifier output 30 constant. The uniformly compressed speech envelope from the pre-amplifier 2 is applied, via the output line 30, in parallel to 14 frequency selectors F2 to F15, generally referenced 80, and also to a selector F1, referenced 60. The latter is adjusted to be responsive to the noise frequencies, and F2 through F15 are tuned to specific band frequencies lying in a range extending from 3750 c.p.s. to 260 c.p.s.

The frequencies comprising the fricative sounds are issued from the output of the selector F1 and are capacitively coupled via capacitor 69 to an inverter-amplifier 70. From the latter, the amplified and shaped pulses are applied to an integrating pulse shaper 130 which serves to recognize the presence of frequencies constituting the fricative sounds. Additionally, the integrating pulse shaper provides an integrated signal which is free of any "jitter." From the output of the pulse shaper 130, the integrated signal is passed on via line 138–1 to a transient detector 180, the function of which will be described.

Frequency selectors F2 through F15 are each of the active type which allows compensation for speech losses which normally arise with increase in frequency. Each of these selectors responds respectively to a particular band of frequencies within the range previously indicated, and each provides an output when the specific band of frequencies is present. Sine-wave outputs from the selectors F2 through F15, generally referenced 80, are capacitively coupled respectively to rectifiers R1 through R14, referenced 100, each of which serves to rectify and integrate the specific band of frequencies present to provide a voltage indicative of the energy in the band or bands of frequencies present.

The outputs of these rectifiers are applied in the manner shown to 13 balance detectors 1 through 13, referenced 110. The balance detectors 110 serve to select the largest output from a pair of applied rectifier outputs. The largest output appears at one or the other of two outputs of the balance detector. As an illustration, consider balance detector No. 2 to which are applied outputs from rectifiers R2 and R3. If R2 is greater than R3, the balance detector will issue a negative signal level on the upper output line which represents the inequality $R2 > R3$. Conversely, when R3 is greater than R2, the balance detector issues a negative signal level on the lower output line which represents the inequality $R3 > R2$. On the other hand, should the inputs to the balance detector be of equal magnitude, no negative signal will appear on either of the output lines. The formant location system is thus constituted of a form of differential logic, which comprises the balance detectors and negative AND circuits, connected in the manner shown. This is utilized to provide a resultant output which is indicative of the presence of a local maximum. This local maximum, as illustrated above, denotes that the output of a given rectifier is greater than either of its immediate adjacent rectifiers. The outputs from the negative AND circuits 1–14, generally referenced 120, are applied respectively to integrating pulse shapers 1 through 15, referenced 130. These pulse shapers serve to remove undesired transient effects from the waveforms. The outputs from the integrating pulse shapers 130 are applied to transient detectors 180, which are utilized to detect the presence of transients. All transients that are detected appear on an output line 182 common to all the transient detectors. This common output line 182 is connected to a change pulse generator 205 which integrates the transients which may be present. The output of the change pulse generator 205 is applied to a sample pulse generator 240 and also to a ring drive 255. The ring drive 255 is arranged to respond to the positive excursion (i.e., the beginning) of the change pulse output while the sample generator 240 is arranged to respond to the negative excursion (i.e., the termination) of the output change pulse. This arrangement establishes the necessary timing coordination to cause: the operation of ring 260, the introduction of a delay period after termination of the transients, and finally the generation of the sample pulse to enable sampling of the current group of waveforms which are representative of local maxima that exist after the termination of the last occurring group of transients and before the initiation of the next group of transients.

The storing of formants is effected in a manner similar to that described in copending application Serial No. 161,089, filed December 21, 1961, by G. L. Clapper, and assigned to the common assignee, for storing speech measures. The above describes how the system functions generally. The following describes in detail the various units constituting the system of the present invention.

*Pre-amplifier*

Figure 2H:
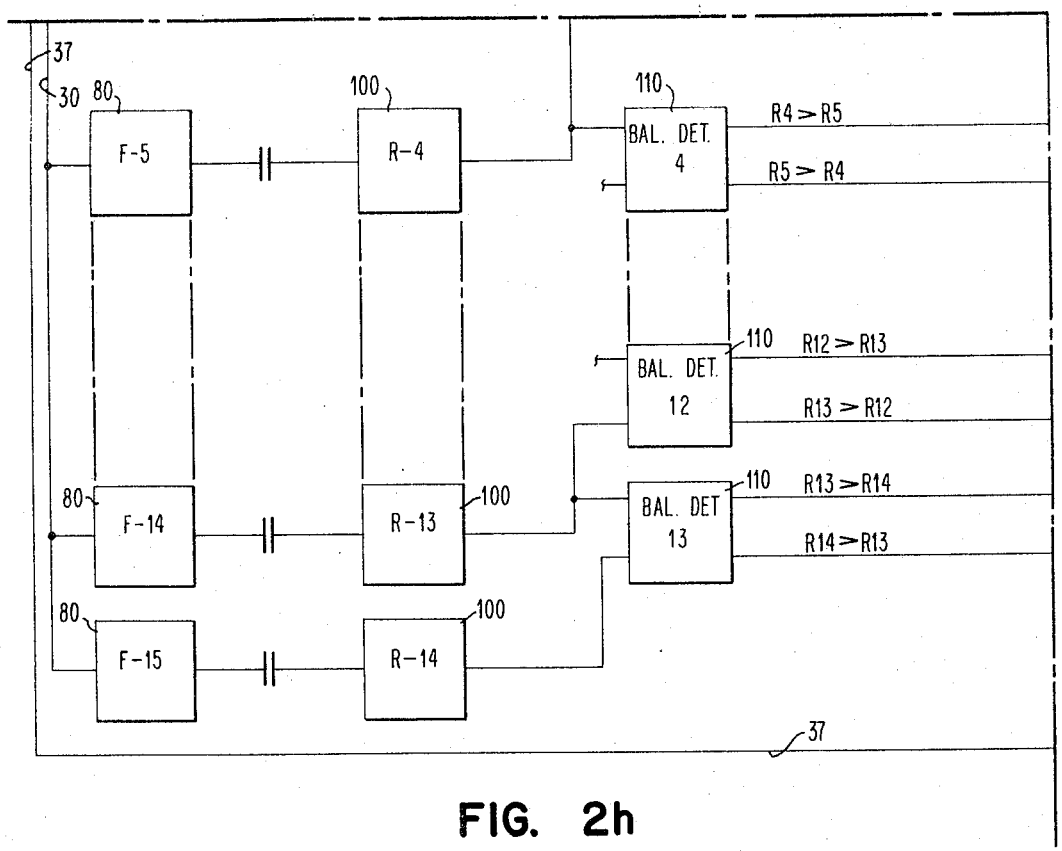
FIG. 2 shows how the details of FIGS. 2a through 2i are assembled to form a composite wiring diagram of the invention.
Figure 2:
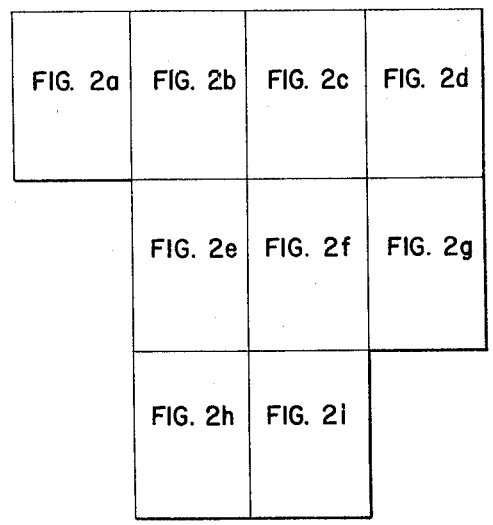
Figure 2A:
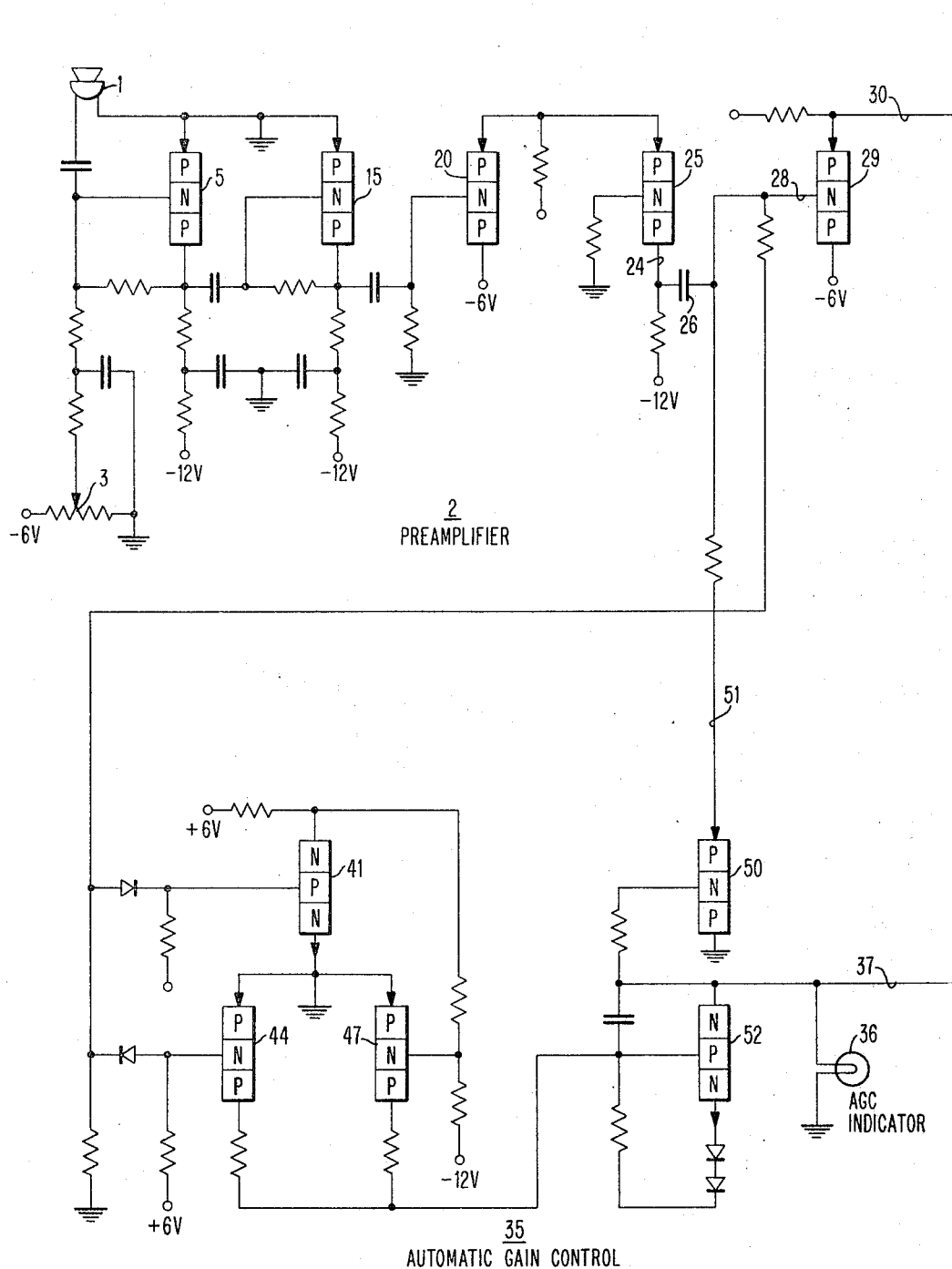

The function of the pre-amplifier 2 is to amplify the low level signals received from the microphone 1 and to provide, in conjunction with an automatic gain control means, to be described, a uniform output. Referring to FIG. 2a, the pre-amplifier comprises essentially five PNP-type transistors, 5, 15, 20, 25 and 29, in the network shown. The first two transistors 5 and 15 are utilized mainly to amplify the incoming waveforms transmitted by the microphone 1. The sensitivity control means 3 is provided to control the gain of the first transistor 5. The amplified output from the second transistor 15 is coupled to the third transistor 20 which, in conjunction with the fourth transistor 25, forms a voltage amplifier having inherent compression properties. The output of the transistor 25, as controlled in a manner to be described by the automatic gain control 35, is applied to transistor 29 which acts as a driver to provide a low impedance to frequency selectors F1 through F15 via the line 30.

*Automatic gain control*

The function of the automatic gain control 35 is to develop an automatic gain control voltage which appears across an indicator 36 to provide a visual indication when the voltage exceeds a predetermined threshold limit. Referring to FIG. 2a, this voltage change is conducted across a transistor 50 which varies the effective impedance thereacross and which is reflected, via line 51, to the preamplifier to the base 28 of transistor 29 and the collector 24 of transistor 25 by way of the coupling capacitor 26.

The normal operation of the automatic gain control circuit is set to plus or minus .4 volt which is the range at which the sensitivity control means 3 in the pre-amplifier 2 is set. The maximum range that the automatic gain control can be overdriven is plus or minus .5 volt, and the threshold value is established at plus or minus .3 volt. When a positive excursion exceeds .3 volt, transistor 41 is rendered conductive and causes transistor 47 to conduct, the output of which is applied to an integrator transistor 52. On the other hand, when a negative excursion exceeds .3 volt, transistor 44 conducts and applies a corresponding input to the integrating transistor 52. The output of the transistor 52 accordingly varies the impedance across the variable impedance transistor 50 and the output from the latter is then reflected, via the line 51, to the input of transistor 29 and to the collector of transistor 25 in the pre-amplifier 2. The output from the automatic gain control transistor is reflected on output line 37 connected to slope detector 145.

*Sibilant selector*

Figure 2B:
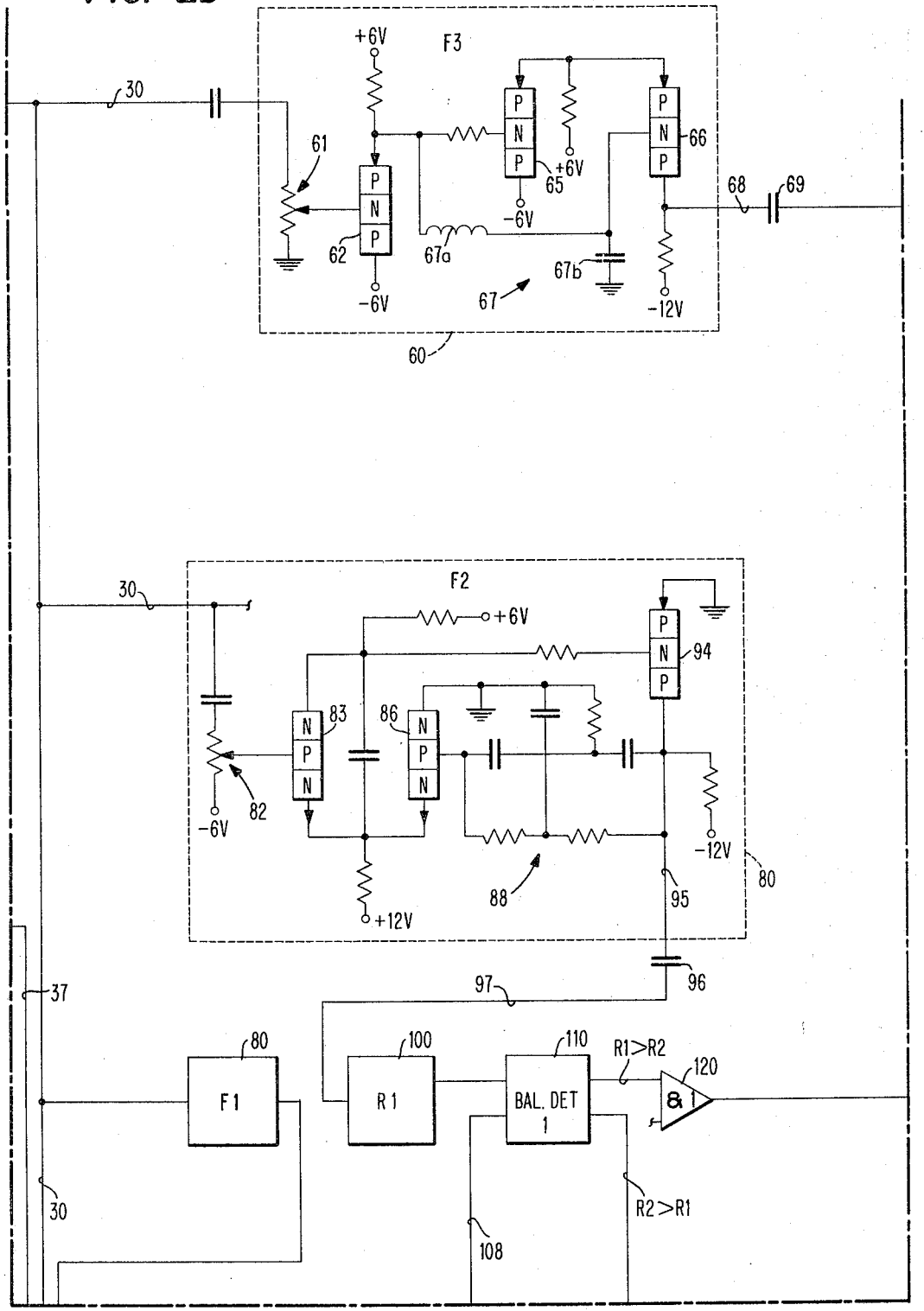

Referring to FIG. 2b, the sibilant selector 60 is used to abstract high frequency noise from the applied audio signal appearing on the line 30. The sibilant selector comprises essentially an attenuator 61, a driver transistor 62 and a difference amplifier consisting of transistors 65 and 66 and a delay network 67 which includes an inductor 67a and a capacitor 67b. The output of the difference amplifier consists of high frequency noise signals above 7 kc.

The output from the sibilant selector is applied through a capacitor 69 to an inverter amplifier 70 which comprises a biasing network whereby a certain threshold limit is established so that only noise signals above this limit will be admitted and applied to transistor 72. The output from the latter is applied to an integrating circuit 73 consisting of a diode 74 and a capacitor 75. The partially integrated signal issued appearing on the integrating circuit 73 is then applied to the integrating pulse shaper 130, IPS 1, which will be described hereinafter in detail.

*Frequency selectors*

The frequency selector 80 functions to provide a very sharp band pass characteristic for a pre-assigned frequency range as indicated in the following chart.

| Band | F. | Range |
|---|---|---|
| F2 | 3,400 | 3,120–3,750 |
| F3 | 2,840 | 2,590–3,120 |
| F4 | 2,340 | 2,140–2,590 |
| F5 | 1,940 | 1,765–2,140 |
| F6 | 1,590 | 1,458–1,765 |
| F7 | 1,325 | 1,192–1,458 |
| F8 | 1,060 | 970–1,192 |
| F9 | 880 | 800–970 |
| F10 | 720 | 655–800 |
| F11 | 590 | 535–655 |
| F12 | 480 | 444–535 |
| F13 | 408 | 375–444 |
| F14 | 340 | 312–375 |
| F15 | 284 | 260–312 |

Referring to FIG. 2b the frequency selector 80 comprises transistors 83 and 86 which operate as a difference amplifier, a twin-T filter network 88 and an output amplifier transistor 94. In operation, the audio input from the pre-amplifier is applied by way of an attenuator 82 to the transistor 83. The output from the latter is amplified by transistor 94, the output from which is applied to the transistor 86 by way of the twin-T filter network 88. Thus, at all frequencies other than the selected frequency range, inputs at the transistors 83 and 86 are substantially equal, resulting in a relatively low output gain. At the selected frequency, the twin-T filter network 88 passes very little signals so that the output of the amplifier is at a maximum. The output appears on line 95 and is applied to the formant location system via capacitor 96 and line 97.

*Formant location system*

Figure 2C:
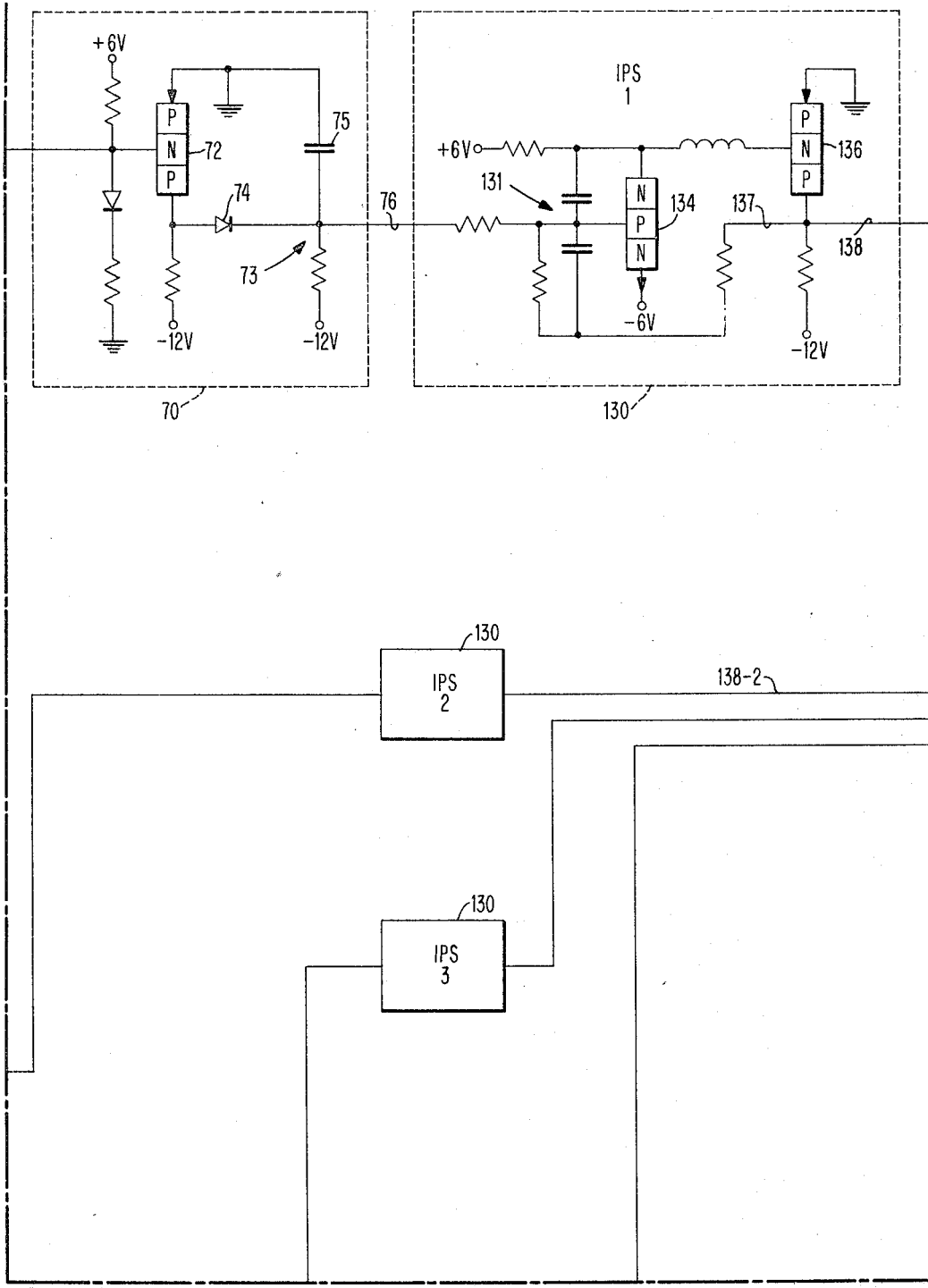
Figure 2F:
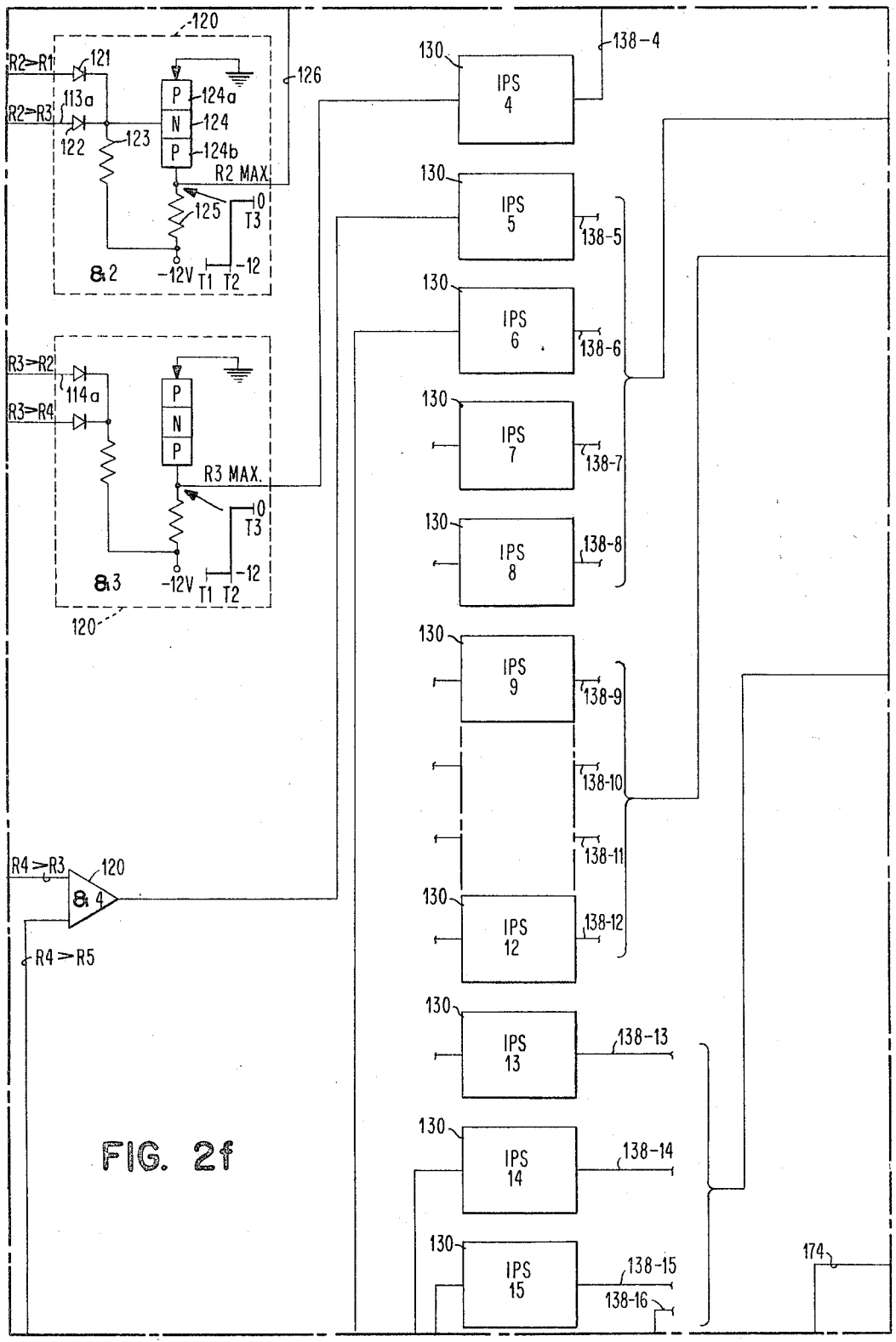
Figure 2G:
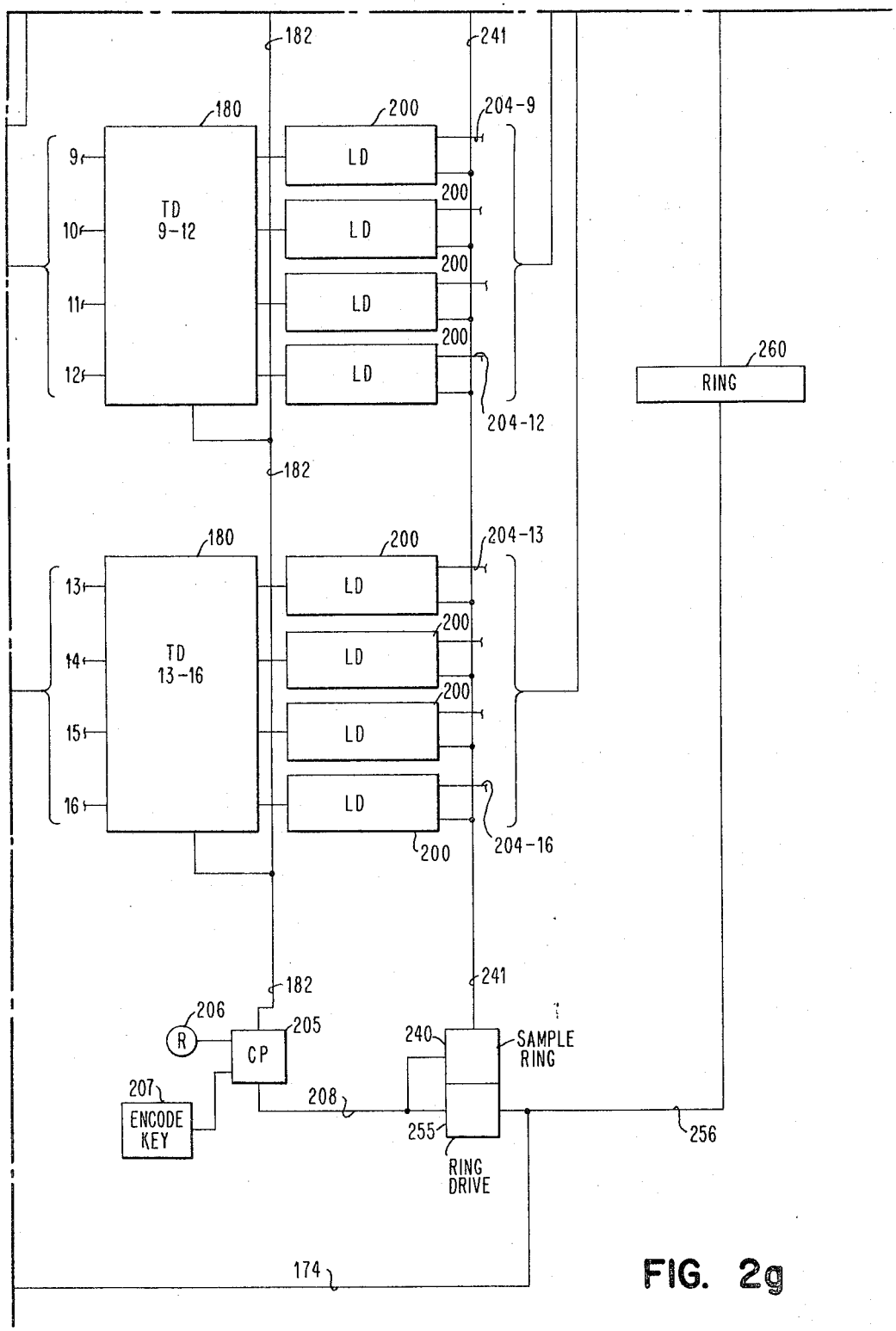

The formant location system is comprised of three basic networks; namely, the rectifier 100, the balance detector 110, and the negative AND configuration 120. The rectifier 100 functions to change the output of the frequency selector to a D.C. level which is proportional to the peak-to-peak A.C. output from the frequency selector. Referring to FIGS. 2e and 2f, the rectifier 100 comprises primarily a limiting resistor 102, a diode 103 and an NPN transistor 104 arranged as an emitter follower having in its output a limiting resistor 106 and a filter capacitor 107 coupled to ground. The diode 103, in conjunction with the transistor 104, serve as a voltage doubler to charge the filter capacitor 107 to the full peak-to-peak value of the A.C. input.

Referring to FIG. 2e, the balance detector comprises transistors 112 and 115 connected in the manner shown, the arrangement serving as a balance amplifier with transistor 117 connected in common to both emitters. By virtue of this arrangement, transistor 117 serves as a control for limiting current flow through the transistors 112 and 115.

As already previously mentioned, the primary function of the balance detector is to compare the D.C. level outputs from a pair of adjacent rectifiers. For example, one of the rectifier outputs on line 108 from the rectifier R2 is applied to transistor 112 of balance detector No. 2, whereas the output on line 108a from the second rectifier R3 is applied to transistor 115. To explain the function of the balance detector, consider first the condition where the D.C. applied levels are of equal magnitude. Under such condition and considering the fact that the function of transistor 117 is to limit the total current flow through transistors 112 and 115 to 4 milliamperes, it follows that, because of the equal D.C. levels, equal currents flow through both transistors 112 and 115, thus limiting the current flow to 2 milliamperes through either of these transistors. The 2-milliampere current flows across associated 2K resistors 113 and 114 to produce a 4-volt drop which places the output at +2 volts above ground, this being considered an inactive condition.

An active condition results when one or the other of two inputs appearing on the lines 108 and 108a is greater than the other. For example, consider the input to transistor 112 greater than the input to transistor 115. In this example, transistor 112 will now draw substantially all the current that is controlled through transistor 117 which is approximately 4 milliamperes. Under this condition, the drop across the 2K resistor 113 at the output of transistor 112 is substantially 8 volts to provide an active signal at −2 volts below ground.

Conversely, when the input to the transistor 115 is greater than the input to transistor 112, the current flow through the transistor 115 will cause an 8-volt drop across its output resistor 114, thus providing an active signal of −2 volts below ground.

The active output of the balance detector expresses an inequality between a pair of applied rectifier outputs. For example, balance detector No. 2 provides an output which indicates that rectifier No. 2 output is greater than rectifier No. 3 output (R2>R3) or an indication that rectifier No. 3 output is greater than rectifier No. 2 output (R3>R2). The negative AND circuits 120 are employed to determine the conjunction of two inequalities representative of a local maximum. The outputs from an adjacent pair of balance detectors; for example, balance detectors Nos. 2 and 3, are applied to negative AND circuit No. 3 which establishes a local maximum on its output line; namely, that the output of rectifier No. 3 is greater than the output from either rectifier No. 2 or No. 4.

Figure 3:
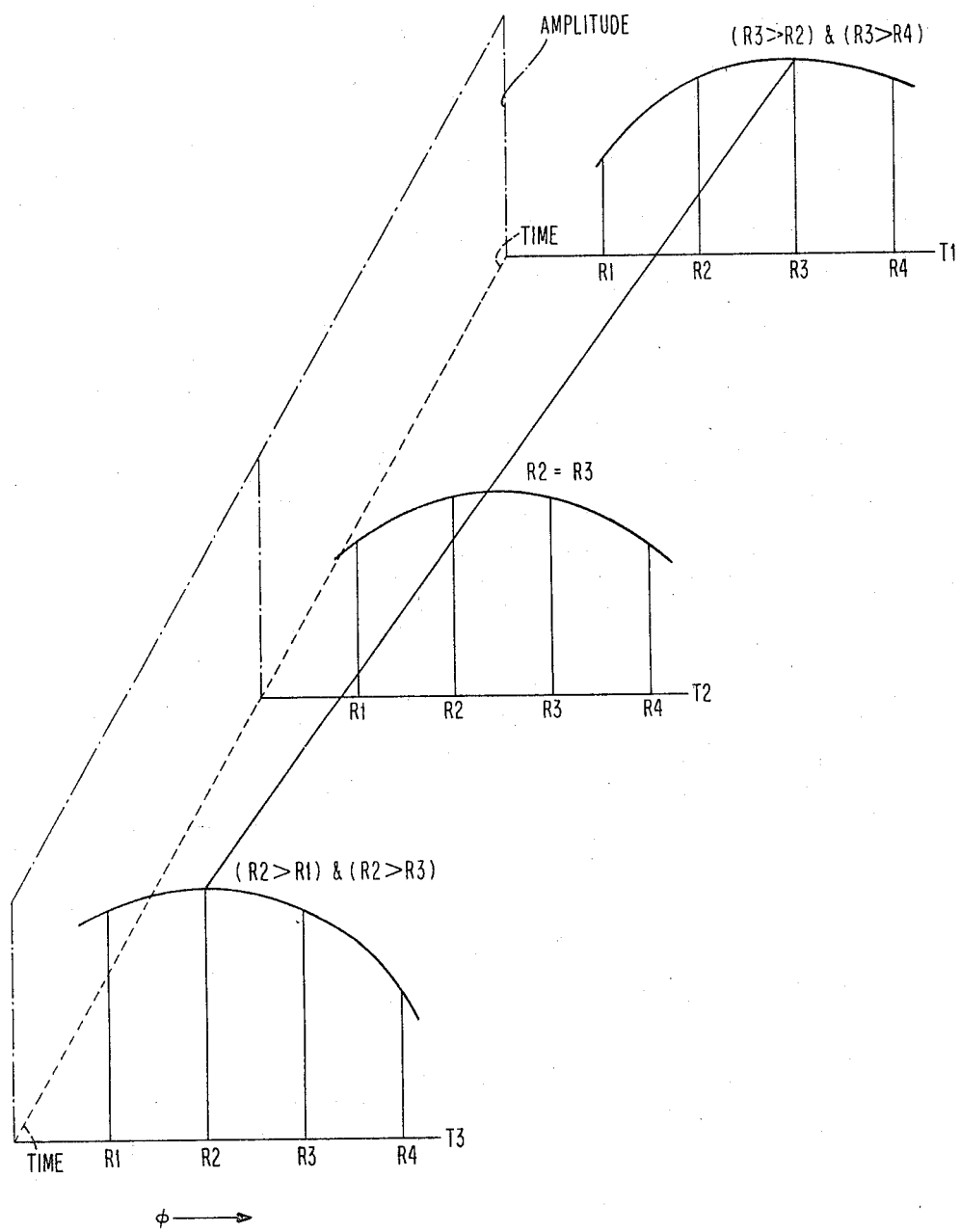
FIG. 3 is a 3-dimensional graphical representation illustrating a changing formant.

To appreciate the manner in which the invention locates successive local maxima in a changing formant, reference is invited to FIG. 3 to the 3-dimensional representation in which the vertical coordinate Y represents the voltage output of the rectifiers R1, R2, R3 and R4 which, as previously described, represents the energy concentrations in the speech formant, the horizontal coordinate X representing frequency decreasing from left to right, and time being represented along the Z coordinate. The formant is shown represented as a contoured ridge wherein three sections are shown at time intervals T1, T2 and T3 to illustrate the changing condition of the formant. At time T1, the condition of the formant shows a local maximum at R3. At time T2, there exists a transient condition in which the local maximum is shifting from R3 to R2. At time T3, the local maximum exists at R2.

The above illustration indicates how a single local maximum is located in the range of frequencies passing through the frequency selectors F2 through F5. It should be realized that the remaining structures, selecting the remaining frequencies previously indicated in the chart, are employed in similar fashion to locate other local maxima that may be present. Thus, at any one time, as many as five local maxima may exist in the speech spectrum.

Negative AND circuits

As illustrated in FIG. 2b, the outputs emerging from the left-hand side of each of the balance detectors 110 are applied to the right-hand side of each of the negative AND circuits 120; for example, the outputs from balance detector No. 2 are applied to negative AND circuits No. 2 and No. 3. The function of the negative AND circuit is to detect the coincidence of the negative active signals issued by the balance detectors. The negative AND circuit 120, as shown in FIG. 2f, comprises an input network consisting of a pair of input diodes 121 and 122, a resistor 123, and a transistor 124, to which the input network is connected as shown.

In operation, consider a condition where both inputs to the negative AND circuit are active (that is, the signals are constituted of negative signal levels below ground). Under this condition, both diodes 121 and 122 will be reverse biased, resulting in a current flow through the transistor 124 from emitter 124a through base and through the resistor 123 to −12 volts. This causes a current flow through the transistor from emitter through collector 124b and through resistor 125 to −12 volts. Due to this latter current flow, the collector rises to substantially ground level, providing an output on line 126 which is indicative of the local maximum.

When one or the other of the two inputs to the negative AND circuit is positive, the base of the transistor 124 is raised above ground level, thus cutting off conduction in the transistor, thereby resulting in a drop in the output thereof to substantially −12 volts, this being indicative of the off condition.

The waveforms shown at the input diodes 121 and 122 of the negative AND circuits 2 and 3 are representative of conditions shown in the 3-dimensional representation of FIG. 3. It can be seen at the beginning of the waveforms at time T1 that both inputs to the negative AND circuit 3 are negative, resulting in an output from the latter circuit. At time T2, the waveforms are changing and this is indicative of the transient condition. At time T3, the output of the negative AND circuit 2 has risen to ground as a result of both of its inputs being at a negative level, thus illustrating the transition of the local maximum from the output of the negative AND circuit 3 to the output of the negative AND circuit 2. The outputs representing a local maxima from the various negative AND circuits 1 through 14 are applied to the integrating pulse shapers which, as earlier described, function to remove jitter; that is, undesirable transients from the signals representing local maxima.

Integrating pulse shaper

The function of the integrating pulse shaper (IPS) 130 is to remove jitter present in the applied incoming signals and provides an integrated and shaped output signal. The IPS 130, as seen in FIG. 2c, comprises transistors 134 and 136 with an integrating network 131 at the input of transistor 134 and a feedback loop 137 from the output of transistor 136 to the input of transistor 134. The feedback network includes a resistor divider circuit which provides hysteresis characteristics. The hysteresis action, as shown in FIG. 4, may be described as follows. A steady rising D.C. signal, when applied to the input network of the IPS, follows the hysteresis loop beginning at a point A on the loop and slowly rises to a point B as the voltage increases from a −12-volt value to a value approximating −4 volts. At a voltage slightly exceeding −4 volts, the collector output of transistor 136 rises sharply from point B to point C and any small variation in the voltage at point C will not alter the amplitude of the output voltage at the collector of 136. To turn the output off, the input voltage must be lowered to a value near −8 volts, at which value the output voltage drops sharply from point D to point E on the hysteresis loop.

For A.C. signals, an integrating action takes place by virtue of the circuit which includes the input resistor and the capacitor between the base and collector of transistor 134. By virtue of this, A.C. signals are integrated to an effective D.C. input and will have substantially the hysteresis action just explained.

The pulse shaping aspect of this circuit is accomplished through the positive feedback loop 137 extending from the collector of transistor 136 to the base of transistor 134. When the input rises to −4 volts, conduction is established in transistor 134, which causes the collector voltage to drop to a value below ground. The effect of this is to establish conduction in transistor 136 to produce a rise at the collector of transistor 136 which is fed back by way of the feedback loop 137 to reinforce conduction in the transistor 134. This results in a sharp positive excursion for the leading edge of the output waveform on line 138. When the input drops to an effective value of −8 volts, the transistor 134 cuts off causing the voltage at the collector thereof to rise, thereby cutting off conduction in transistor 136. The resultant drop at the collector of transistor 136 is fed back, by way of the feedback loop 137, to reinforce cutting off conduction in transistor 134. The resultant sharp excursion provides a steep cutoff for the trailing edge of the output waveform. In this manner, the IPS output waveform is provided with substantially a square wave with sharp leading and trailing edges and free of jitter.

*Slope detector*

Figure 2I:
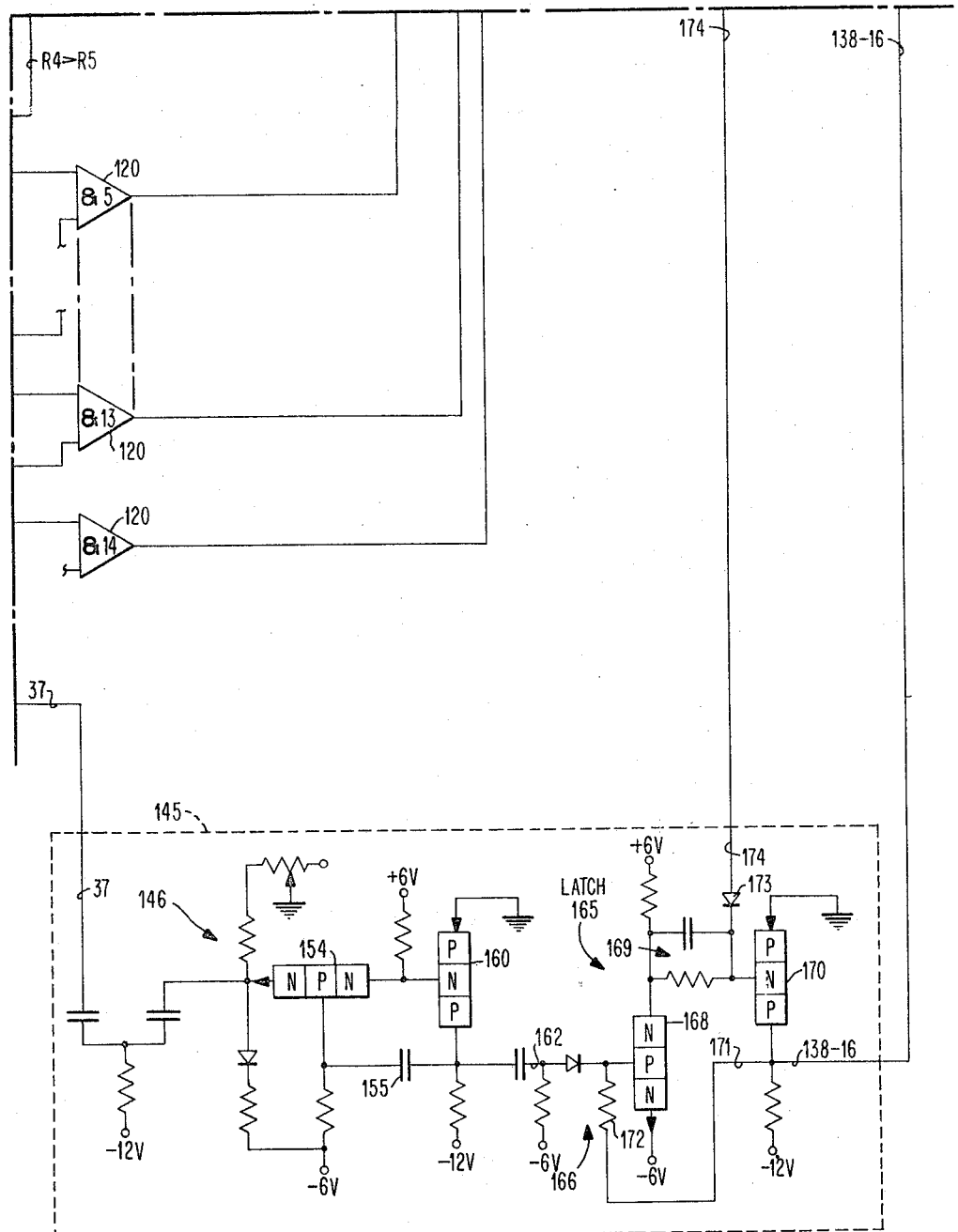

The slope detector 145 inspects the automatic gain control waveform for the presence of sharp negative transients on line 37 which indicate sudden bursts in voice intensity. The slope detector, as shown in FIG. 2i, comprises an input network 146 and a pair of transistors 154 and 160. Transistor 154, in conjunction with the input network 146, conducts as a function of the negative slope of the automatic gain control waveform appearing on the line 37. If the slope of the waveform is great enough, current will flow in an amount sufficient to cause conduction through the transistor 160; the latter will then emit a positive-going pulse which is fed back, by way of capacitor 155, to the base of transistor 154 resulting in a pulse-forming action. This positive pulse is capacitively coupled via line 162 to the input of a storage latch 165.

The storage latch 165 comprises an input network 166 and a pair of transistors 168 and 170 with a D.C. feedback path 171 including a resistor 172, connecting the transistors 170 and 168. The latch 165 also has a diode 173 connected to the base of transistor 170 for the purpose of resetting the latch.

In operation, the pulse from the slope detector is coupled via line 162 to the input network 166 to raise the base of transistor 168 to above −6 volts to cause conduction therethrough. This results in a negative drop at the collector of transistor 168, which drop is transmitted through a capacitor-resistor network 169 to the base of transistor 170, which causes conduction in the latter to provide a signal on an output line 174 thereof from −12 volts to ground. This signal is fed back through the resistor 171 to the transistor 168 to maintain conduction, thereby holding the latch on. The latch remains in this on state until dropped by the application of a positive ring drive signal applied, via line 174, diode 173, to the base of transistor 170. Thus, the presence of a burst in voice intensity will be stored in the latch 165 until it is sampled.

As previously described, the output of the integrating pulse shaper No. 1 denotes the presence of sibilant energy in the speech spectrum, this output appearing on line 138–1. The outputs from the integrating pulse shapers 2 through 15 represent local maxima occurring in various parts of the speech spectrum, and these outputs are applied on output lines 138–2 to 138–15. The output of the slope detector latch, as just described, represents an intensity burst which is applied to line 138–16. These 16 output lines, in effect, represent a total of 16 possible measurements of the speech spectrum. These 16 measurements are transmitted by way of the 16 output lines 138–1 to 138–16 to the transient detectors 180.

*Transient detectors*

The transient detectors 180 comprise 16 individual circuit networks 183, each connected to one of the 16 lines 138–1 to 138–16. As seen in FIG. 2d, the transient detectors are arranged in groups of four with their outputs connected to a common transistor driver 181 which provides an output for the group. These groups, in turn, are connected to a common output line 182. The arrangement provides an output on said output line 182 in response to the presence of either a positive or a negative transient on any one of the 16 lines 138–1 to 138–16.

The structure of an individual transient detector comprises the network 183 consisting of an input capacitor 183a connected to a terminal 184 intermediate a pair of diodes, left diode 183l and right diode 183r, oriented in opposing relationship to direct positive transients through the capacitor 183a and the right diode 183r; and negative transients, through the capacitor 183 and the left diode 183l. The four left diodes are connected in parallel to a common line 185 which is connected to the base of a driver transistor 181 by way of a 1K limiting resistor 186, the four right diodes are connected in parallel to a common line 187 connected to the emitter of the driver transistor 181. Biasing resistors 188 and 189 are applied to the emitter and base of the transistor to hold the latter in a normally cutoff condition. Limiting diodes 190 and 191 connected to ground are used to limit the excursion at the base and emitter of the driver transistor 181.

In operation, the presence of a positive transient, say, on the line 138–1, for example, is coupled to the input capacitor 183a and is passed through the right-hand diode 183r to the emitter of the driver transistor 181, via line 187, causing the emitter to be driven to a value above ground. At this time, the base of the transistor is held at or near ground by the limiting diode. As a consequence to this, current flows in the PNP transistor 181 to produce a positive output on the common line 182 connected to the change pulse generator 205. A negative transient appearing on the line 138–1 is coupled through the capacitor 138a and through the left diode 183l to the common line 185 and to the base of the transistor 181 to drive the latter to a negative condition. At this time, the emitter is held to near ground by virtue of its limiting diode and the negative signal at the base of transistor 181 produces a positive output pulse which is passed on to the change pulse generator 205. In a similar manner, transients appearing on the remaining lines 138–2 to 138–16 provide similar pulses on the output line 182 connected to the change pulse generator 205.

*Line driver*

In addition to being connected to the transient detectors 180, the 16 lines 138 are also connected to 16 line drivers 200, one for each input line. The line driver provides driving power to the inputs leading to the matrix 270 wherein the information, including the formants, are stored. The line driver also provides isolation from a sampling pulse connected to the output of the line driver. Referring to FIG. 2d, each line driver comprises a PNP transistor 201, a load resistor 202 and a diode 203. The input line 138 is connected to the base of the transistor 201 which acts as an emitter follower to provide a low impedance output to the matrix via output line 204–1. The sampling pulse is applied via line 241 to all line drivers 200 by way of the isolating diode 203 so that the output will be held down or off except at sampling times. During each sampling time, the information appearing on lines 138–1 to 138–16 are applied to the matrix 270 via the drive lines 204–1 to 204–16. Sampling of the line driver does not interfere with the action at the input to the line driver because of isolation provided by the PNP-type transistor 201.

*Change pulse generator*

The function of the change pulse generator 205 is to integrate groups of pulses issued by the transient detectors 180 into one change pulse having a characteristic such that it is on during transient changes and off for a certain period thereafter with no unwanted transients. In effect, this operation is similar to that described hereinabove for the integrating pulse shaper 130 and is further described in detail in the copending application Serial No. 161,089, filed December 21, 1961, by G. L. Clapper, and assigned to the common assignee. The change pulse generator 205 also includes a resolution control means 206 which determines the smallest interval of no change which is considered significant. A control, in the form of an encode key 207, is included which inhibits the outputs from the transient detectors from being effective, except at such times when the encode key is on. This is further described in detail in said aforementioned copending application. The output of the change pulse generator 205 is applied via line 208 to a sample gate 240 and a ring drive 255, the former being responsive to the negative or trailing edge of the change pulse output signal, and the latter being responsive to the positive or leading edge of the change pulse output signal. Details of these are further described in said aforementioned copending application. The output of the ring drive 255 is applied via line 256 to a ring 260 which controls the vertical drive lines of the matrix 270 in the manner explained in said copending application.

The relationship of the various waveforms appearing on the 16 lines 138–1 to 138–16, the transient detectors 180, the change pulse generator 205, the sample pulse generator 240 and the ring drive 255 are shown in detail in the waveform chart of FIG. 5. The chart shows the specific waveforms generated, and their interrelationships, in response to the spoken word "four."

Figure 6:
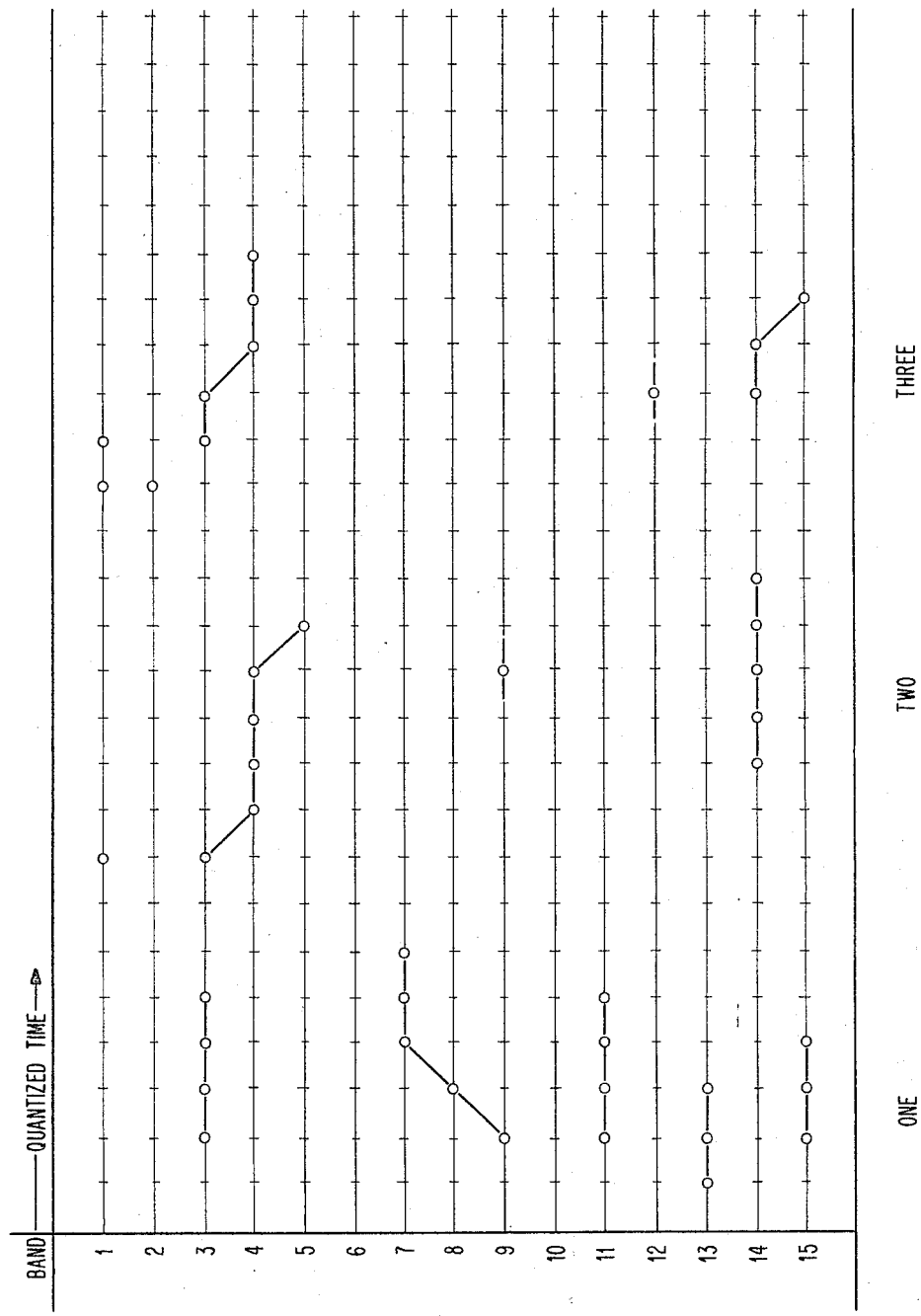
FIGS. 6, 7 and 8 show formant generation for the spoken words "one" through "nine."
Figure 7:
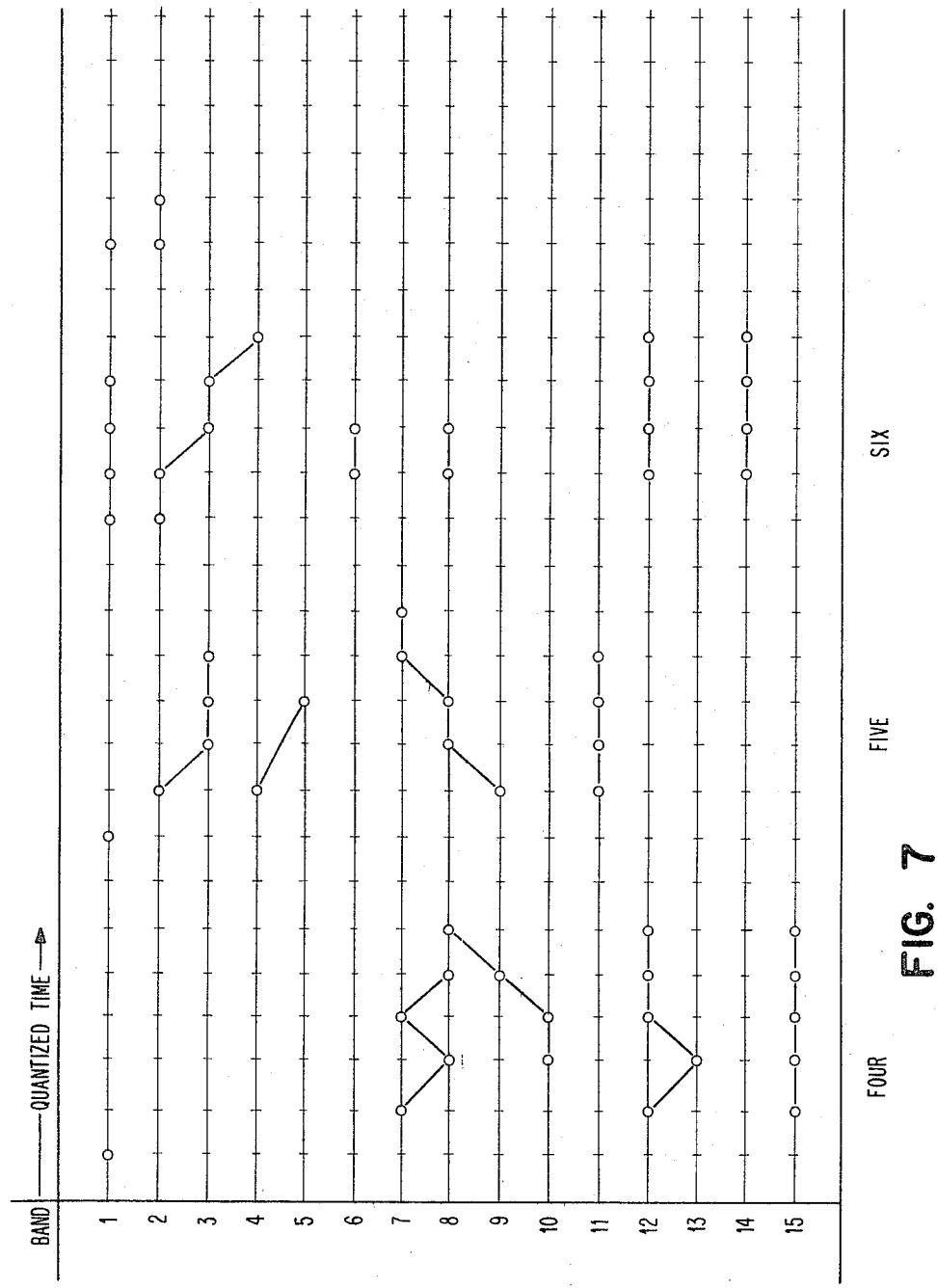
Figure 8:
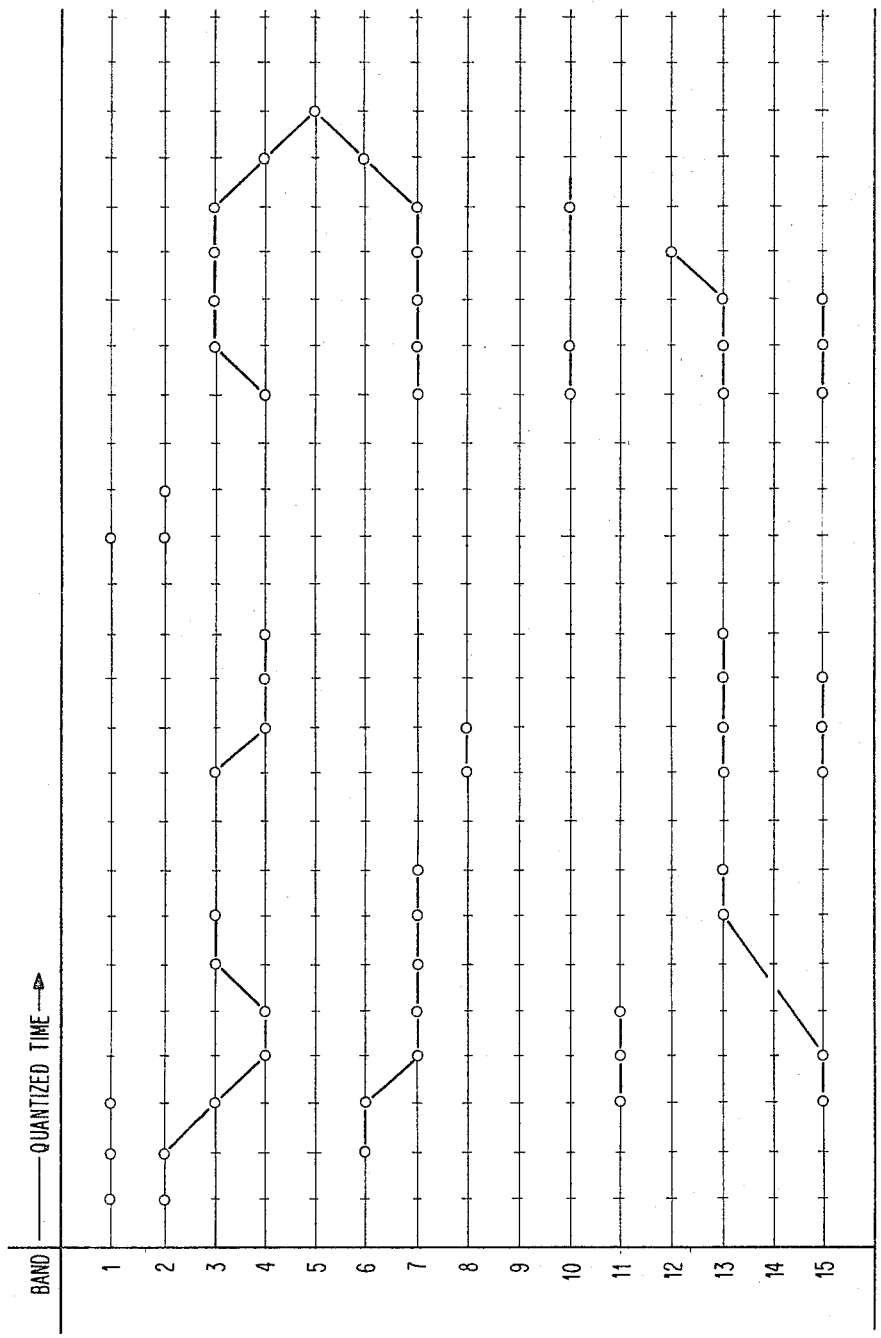

The drawings of FIGS. 6, 7 and 8 show concentration peaks for the spoken words "one" through "nine." These concentration peaks are interconnected by short dashes to show graphically the formation of the formants. The information, as it appears in the drawings of FIGS. 6, 7 and 8, is identical to the information stored in the storage matrix. Each storage cell of the storage matrix may be adapted to drive an indicator lamp, for example, to give a visual display of the speech formants, as shown in FIGS. 6, 7 and 8.

In addition, readout means may be provided to read out the stored information to other devices for speech recognition, for example.

While the invention has been particularly shown and described with reference to a preferred embodiment thereof, it will be understood by those skilled in the art that various changes in form and details may be made therein without departing from the spirit and scope of the invention.

What is claimed is:

1. A speech analyzing system for locating formants representing energy peaks in the speech spectrum constituted of a plurality of bands of frequencies comprising:
   a plurality of frequency selectors, each responsive to a particular band of said plurality of bands of frequencies;
   a related plurality of frequency selector output lines, each providing a unique voltage when the particular band is present in the spectrum;
   a plurality of rectifying means, connected to said output lines, for providing a plurality of D.C. voltages, each corresponding to a different unique voltage;
   a plurality of balance detectors including a related plurality of pairs of balance detector output lines, each pair connected to a different balance detector; and
   a maximizing network comprising a plurality of logic circuits, each circuit connected to a different pair of balance detector output lines, for issuing the formant representing peaks of energy in said spectrum.

2. A speech analyzing system for locating formants representing energy peaks in the speech spectrum constituted of a plurality of bands of frequencies comprising:
   a plurality of frequency selectors, each responsive to a particular band of said plurality of bands of frequencies;
   a related plurality of frequency selector output lines, each providing a unique voltage when the particular band is present in the spectrum;
   a plurality of rectifying means, connected to said output lines, for providing a plurality of D.C. voltages, each corresponding to a different unique voltage;
   a plurality of balance detectors including a related plurality of pairs of balance detector output lines, each pair connected to a different balance detector;
   a maximizing network comprising a plurality of logic circuits, each circuit connected to a different pair of balance detector output lines, for issuing the formant representing peaks of energy in said spectrum; and
   transient detecting means for detecting the occurrence of transients in said formants.

3. A speech analyzing system as in claim 2 further including sampling means for sampling the formants following the occurrence of said transients.

4. A system as in claim 3 further including frequency analyzing means responsive to frequencies in the spectrum which constitute the fricative sounds, and means for detecting transients occurring in said fricative sounds.

5. A system as in claim 3 further including means for detecting intensity bursts caused by the presence of plosive sounds in the spectrum, and means for detecting transients occasioned by said plosive sounds.

6. A system as in claim 5 further including a storage matrix with associated storage control means responsive to said sampling means for storing said formants.

References Cited by the Examiner

UNITED STATES PATENTS

| 2,575,909 | 11/1951 | Davis et al. | 179—1 |
| 2,575,910 | 11/1951 | Mathes | 179—1 |
| 2,891,111 | 6/1959 | Flanagan | 179—1 |

WILLIAM C. COOPER, *Acting Primary Examiner,*

R. MURRAY, *Assistant Examiner.*